Oct. 8, 1940.  H. HILL ET AL  2,217,276

ELECTRIC CONDUCTOR

Filed June 27, 1938  2 Sheets—Sheet 1

INVENTORS
HARRY HILL and
THOMAS BURTON ROSE
BY Stebbins, Blenko + Parmelee

ATTORNEYS

Oct. 8, 1940.   H. HILL ET AL   2,217,276
ELECTRIC CONDUCTOR
Filed June 27, 1938   2 Sheets-Sheet 2

INVENTORS
HARRY HILL and
THOMAS BURTON ROSE
By Stebbins, Blenko & Parmele
ATTORNEYS

UNITED STATES PATENT OFFICE 2,217,276

ELECTRIC CONDUCTOR

Harry Hill and Thomas Burton Rose, Belvedere, Kent, England, assignors to Callender's Cable and Construction Company Limited, London, England, a British company Application June 27, 1938, Serial No. 215,956
In Great Britain July 8, 1937

1 Claim. (Cl. 174—129)

This invention is concerned with electric conductors having a longitudinal duct. The production of a conductor of circular cross-section and having a longitudinal duct may be readily carried out by employing a hollow core member of circular cross-section and applying wires helically to the core. On the other hand it is difficult to build up a conductor satisfactorily by stranding on to a hollow core member of non-circular cross-section. By the present invention we dispense with the necessity of employing a hollow core member to form a longitudinal duct in the conductor. According to the present invention, a conductor of non-circular cross-section having a longitudinal duct is built up of component conductors each consisting of wires stranded together and having a shape in cross-section appropriate for the non-circular cross-section of the completed conductor. In the built up conductor thus formed the cross-sections of the component conductors are such as to provide a longitudinal duct between them.

Figure 1:
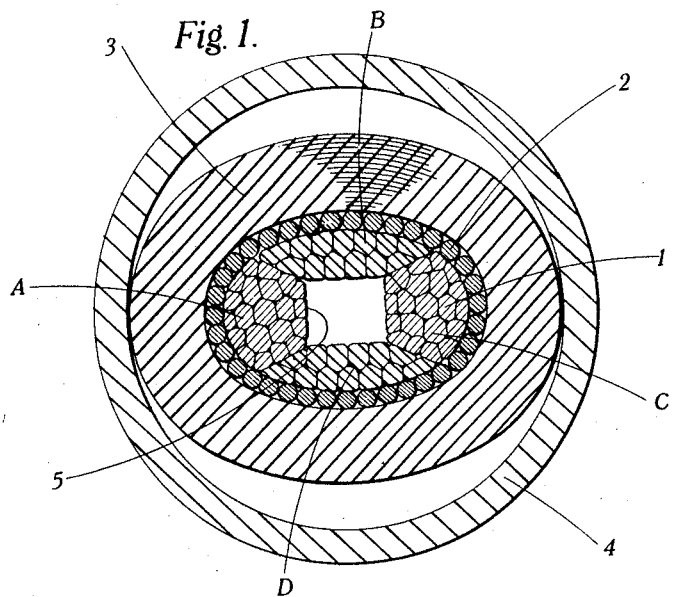
Figure 3:
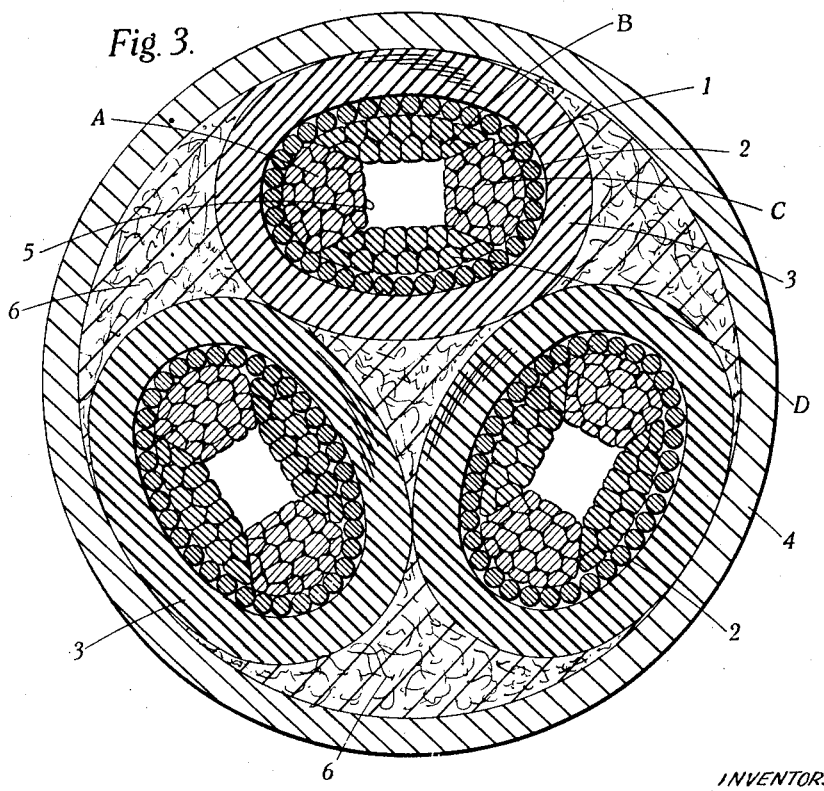
Figure 2:
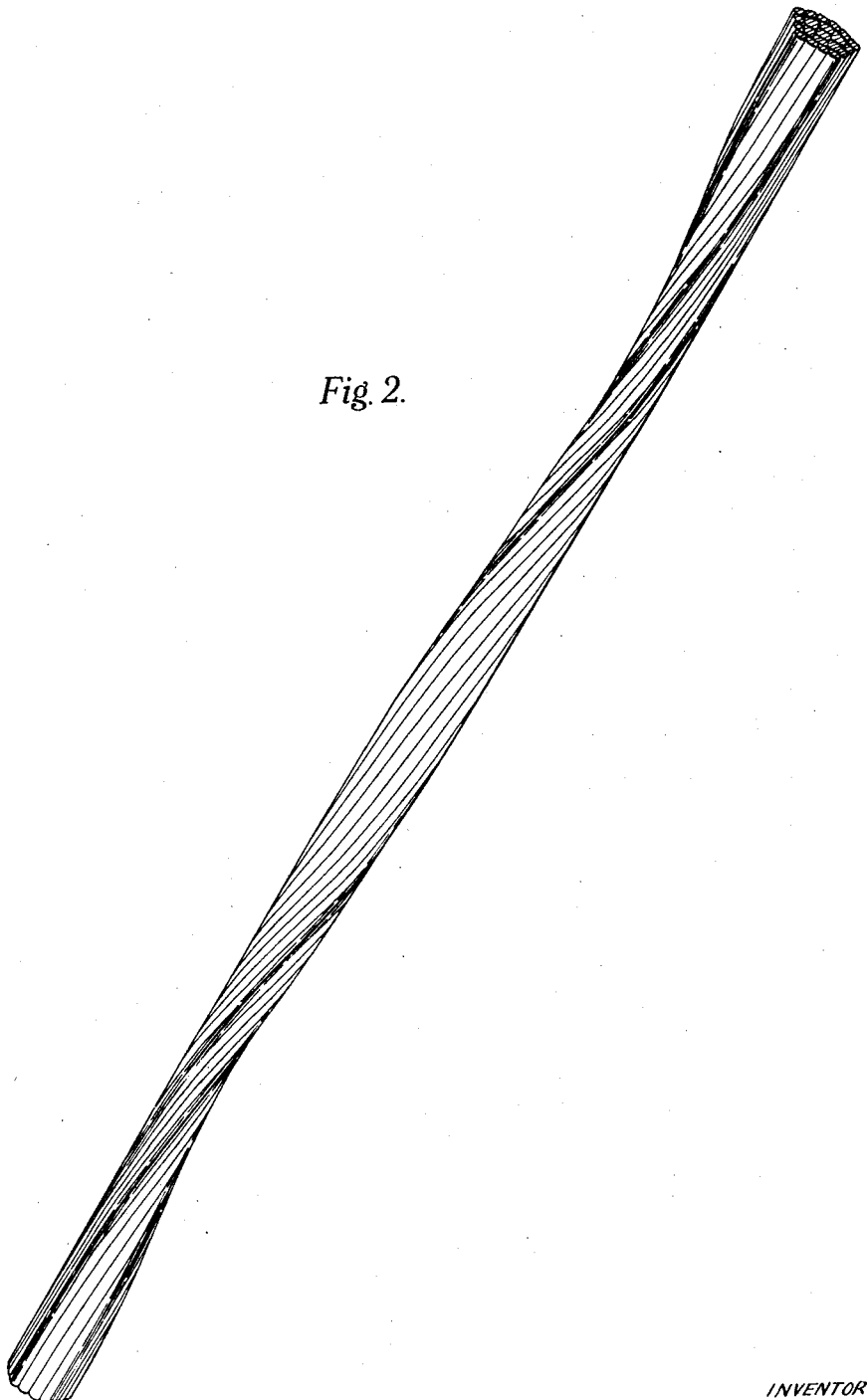

The invention will be further described with the aid of the accompanying drawings wherein:

Figure 1 is a cross-section of a single core cable, drawn to an enlarged scale,

Figure 2, a perspective view of a component conductor, also drawn to an enlarged scale and, Figure 3, a cross-section of a multicore cable, also drawn to an enlarged scale.

Referring to Figure 1, the cable comprises a conductor indicated generally by the numeral 1, a layer 2 of wires immediately surrounding the conductor 1, a dielectric 3 applied over the layer 2, and an enclosing lead sheath 4. As will be seen from the figure, the conductor 1, layer 2 and the dielectric 3 are each of elliptical cross-section, while the lead sheath 4 is of circular cross-section. These parts, however, need not necessarily have the shapes shown but may be varied. The dielectric 3 may be, for example, impregnated paper.

The conductor 1 has a central duct 5 which extends longitudinally thereof. This duct is produced in the following manner. The conductor is built up from a number of component conductors of which the figure shows four, indicated respectively by the letters A, B, C and D. These component conductors are so shaped that when they are assembled together they provide an outer surface having a substantially elliptical contour when viewed in a direction axially of the conductor. The component conductors are also of such a shape that upon assembly they enclose the duct indicated by the numeral 5. In the figure the component conductors B and D are of elongated flattened shape with a curved outer surface and three more or less straight inner surfaces. The two other component conductors A and C also form foursided figures with curved outer surfaces and more or less straight inner surfaces but they are not so flattened or elongated as the other component conductors and approach more nearly to the circular form. When the component conductors are assembled they fit into each other and form the elliptical conductor 1 and enclose the duct 5.

Each component conductor is made by stranding together an appropriate number of wires which will generally be of circular cross-section. To obtain an approximation to the final shape in cross-section of the component conductors, the wires chosen for the component conductors may be of different diameters. In the figure, the component conductors B and D are shown composed of wires of the same diameter, whereas in the component conductors A and C the wires are shown of different diameters. When the wires are stranded together they are passed through a closing die which compresses and compacts the component conductors and causes each wire to fit closely into the spaces between adjacent wires, the latter in this process being deformed somewhat from their original circular cross-sectional shape. The figure indicates approximately the distortion of the wires and the manner in which they fit into each other. This compacting of the wires may be effected by the roller die apparatus described in the specification of U. S. Patent No. 2,128,777.

After assembling the component conductors they are held together by the layer 2. This layer consists of wires of circular cross-section applied helically over the assembly. Other members, however, may be employed to hold the component conductors in position.

The component conductors may lie parallel with the axis of the conductor 1 or they may be stranded together and they may be prespiralled before being stranded together with a lay equal to the stranding lay. By prespiralling we mean giving to the conductor its required non-circular shape in cross-section in such a manner that the non-circular configuration rotates about the axis of the conductor along its length. This rotation of the non-circular configuration is indicated in Figure 2 which shows a component conductor corresponding to that shown at A or C in Figure 1 or 3, which has been prespiralled.

In the construction shown in Figure 3, the cable comprises three cores. Each core comprises a conductor 1, a layer 2 of wires, dielectric 3 and an enclosing lead sheath 4. The conductors, layers and dielectric are of elliptical cross-section as in Figure 1 and each conductor is built up of four component conductors A, B, C and D as in that figure. These component conductors enclose ducts 5 which extend longitudinally of the component conductors. The spaces between the three cores and between the cores and the sheath 4 are filled up with fillers 6 which may be of paper or other material.

In Figure 3, the three cores are laid up together and the component conductors A, B, C and D may be prespiralled with a lay equal to that of the cabling lay, that is to say, equal to the lay with which the three cores are laid up. This will avoid twisting of the insulated built up conductors 1 while they are being laid up together to form the three core cable. It will only be necessary to bend them slightly. It will be understood that the component conductor shown in Figure 2 represents its prespiralled form as manufactured and before it is embodied in the cable shown in Figure 3.

What we claim as our invention is:

For an electric cable, a conductor of substantially elliptical cross-section comprising four component conductors fitting together within the periphery of the conductor and thereby forming a self-supporting structure capable of resisting external pressure without collapsing and enclosing a longitudinally extending duct, each of said component conductors being formed of members stranded together, two of the said component conductors being of elongated shape in cross-section and the other two approaching more clearly to the circular form in cross-section, the four component conductors being disposed alternately according to shape.

HARRY HILL.
THOMAS BURTON ROSE.